United States Patent
Hirao

(10) Patent No.: US 10,277,770 B2
(45) Date of Patent: Apr. 30, 2019

(54) IMAGE FORMING APPARATUS FOR CONTROLLING IMAGE READING APPARATUS DEPENDING ON IMAGE PROCESSING CAPABILITY OF THE IMAGE FORMING APPARATUS, IMAGE READING APPARATUS, CONTROL METHOD THEREOF, AND STORAGE MEDIUM

(71) Applicant: CANON KABUSHIKI KAISHA, Tokyo (JP)

(72) Inventor: Toyomi Hirao, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 15/665,823

(22) Filed: Aug. 1, 2017

(65) Prior Publication Data

US 2018/0063356 A1 Mar. 1, 2018

(30) Foreign Application Priority Data

Aug. 26, 2016 (JP) .................. 2016-165739

(51) Int. Cl.
*H04N 1/04* (2006.01)
*H04N 1/00* (2006.01)
(Continued)

(52) U.S. Cl.
CPC ....... *H04N 1/0443* (2013.01); *G06K 15/1219* (2013.01); *H04N 1/00803* (2013.01);
(Continued)

(58) Field of Classification Search
CPC .................. G06F 1/08; G06K 15/1219; H04N 2201/0477; H04N 2201/04782; H04N 2201/0027; H04N 2201/0081; H04N 2201/0082; H04N 2201/04772; H04N 2201/3205; H04N 1/047; H04N 1/17;
(Continued)

(56) References Cited

U.S. PATENT DOCUMENTS 5,123,063 A * 6/1992 Ohkubo ............. H04N 1/32502
358/408
7,233,410 B2 * 6/2007 Sekiguchi .......... H04N 1/00347
358/1.15
(Continued)

FOREIGN PATENT DOCUMENTS

JP 2016054411 A 4/2016

*Primary Examiner* — Chad Dickerson
(74) *Attorney, Agent, or Firm* — Rossi, Kimms & McDowell LLP

(57) ABSTRACT

An image forming apparatus which is capable of reducing a load on a data bus therein when controlling an image reading apparatus depending on its image processing capability. When acquired identification information about the image forming apparatus is included in a clock control table 600, a clock frequency for controlling hardware of the image reading apparatus in accordance with the clock control table 600, while setting the clock frequency therefor to a default setting of the clock control table 600 when the acquired identification information is not included in the clock control table 600, wherein a minimum value of clock frequencies in the clock control table 600 is set as the default setting of the clock control table 600.

15 Claims, 11 Drawing Sheets

(51) Int. Cl.
*H04N 1/32* (2006.01)
*G06K 15/12* (2006.01)

(52) U.S. Cl.
CPC ..... *H04N 1/32101* (2013.01); *H04N 1/32598* (2013.01); *H04N 2201/04772* (2013.01); *H04N 2201/3205* (2013.01)

(58) Field of Classification Search
CPC ............ H04N 1/0402; H04N 1/00347; H04N 1/00931; H04N 1/32358; H04N 1/0443; H04N 1/00803; H04N 1/32101; H04N 1/32598
USPC ........ 358/1.11–1.18, 1.9, 2.1, 3.23, 505, 486
See application file for complete search history.

(56) References Cited

U.S. PATENT DOCUMENTS

| | | | |
|---|---|---|---|
| 7,644,119 B1* | 1/2010 | Anooshfar | H04N 1/00212 709/203 |
| 8,111,420 B2* | 2/2012 | Sekiguchi | H04N 1/00347 358/1.15 |
| 2003/0081253 A1* | 5/2003 | Sekiguchi | H04N 1/00347 358/1.16 |
| 2006/0290998 A1* | 12/2006 | Jung | H04N 1/00204 358/426.03 |
| 2014/0253979 A1* | 9/2014 | Sasaki | H04N 1/00225 358/474 |

* cited by examiner

| MODEL ID | A (Default) | B |
|---|---|---|
| CCD CONTROL CLOCK | 20 MHz | 25 MHz |
| MOTOR CONTROL CLOCK | 10 MHz | 12.5 MHz |
| SCAN SPEED | 80 IPM | 100 IPM |

FIG. 11

| MODEL ID | A (Default) | A | A | A | B | B | B | B |
|---|---|---|---|---|---|---|---|---|
| COLOR/ MONOCHROMATIC | CL | BW | CL | BW | CL | BW | CL | BW |
| READING RESOLUTION | 600 dpi | 600 dpi | 300 dpi | 300 dpi | 600 dpi | 600 dpi | 300 dpi | 300 dpi |
| TARGET IPM | 70 IPM | 80 IPM | 100 IPM | 100 IPM | 70 IPM | 80 IPM | 100 IPM | 100 IPM |

1100

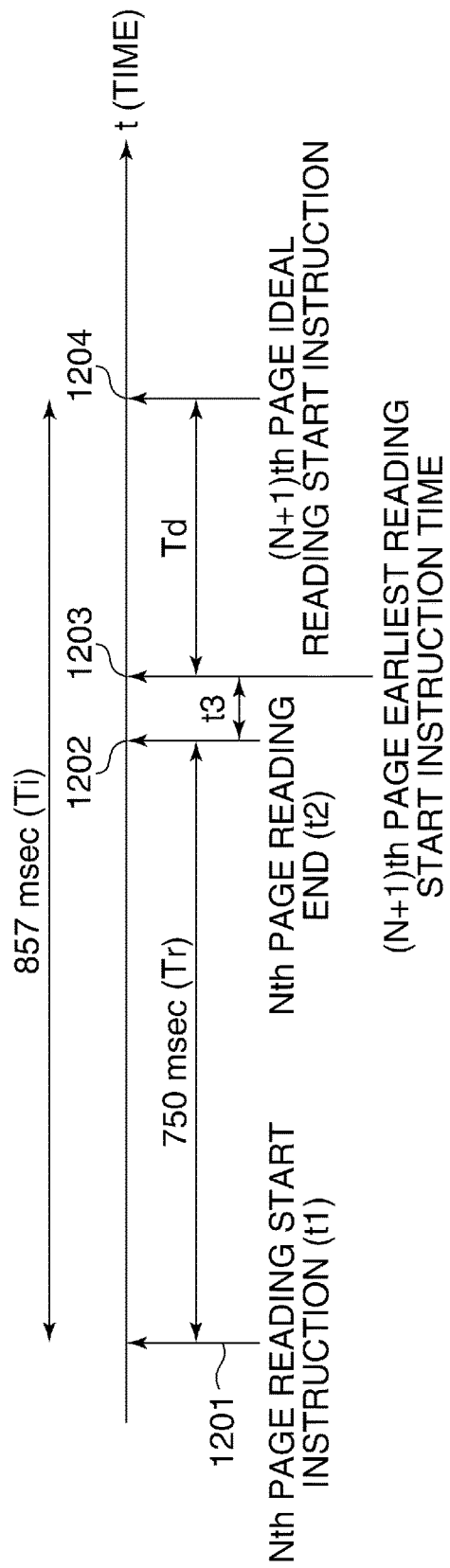

IMAGE FORMING APPARATUS FOR CONTROLLING IMAGE READING APPARATUS DEPENDING ON IMAGE PROCESSING CAPABILITY OF THE IMAGE FORMING APPARATUS, IMAGE READING APPARATUS, CONTROL METHOD THEREOF, AND STORAGE MEDIUM

BACKGROUND OF THE INVENTION

Field of the Invention

The present invention relates to an image forming apparatus for controlling an image reading apparatus depending on image processing capability of the image forming apparatus, the image reading apparatus, a control method thereof, and a storage medium.

Description of the Related Art

Heretofore, a control unit for controlling an image forming apparatus causes control software to operate depending on its image processing capability. For example, a technique is known in which a scan speed is adjusted by control software according to a printing speed so as to cause functions, such as scanning or printing, to effectively operate depending on memory resources, image processing capability, or the like (see Japanese Laid-Open Patent Publication (kokai) No. 2016-54411).

The method for utilizing image forming apparatuses has been diversified and the image forming apparatuses have been produced and sold as models that can change the functions and speeds of image transmission, printing, scanning, and the like depending on user's preferences and usage environments. In transition to a paperless system, especially, the scanning function is widely used for computerization of printed text, and there are various demands for its reading resolution, its scan speed, and the like from users. To cope with such demands, the number of image forming apparatuses that are connectable to various types of scanners which have different reading resolutions and scan speeds has been increasing. Further, the following technique is generally known. That is, settings (modes) of a reading resolution and a scan speed that are determined depending on the image processing capability of each of a plurality of image forming apparatuses are prepared in a scanner to be connected with the image forming apparatus.

However, the adjustment of a scan speed as disclosed in Japanese Laid-Open Patent Publication (kokai) No. 2016-54411 is performed by changing only the interval of reading execution instructions while maintaining the frequency of a control clock for controlling an image reading CCD, or the frequency of a PWM control clock for controlling a stepping motor which conveys an original. Accordingly, when the speeds of these control clocks are higher than the image processing speed or the printing speed of the image forming apparatus, data that is instantaneously caused to flow through a data bus connected with an image processing unit in the image forming apparatus flows without decreasing its speed. This causes a problem that a load on the data bus increases.

On the other hand, when a plurality of modes are prepared in a scanner, these control clocks are adjusted to different frequencies depending on the modes. However, since these control clocks are generated by a PLL (Phase Lock Loop), the frequencies of these control clocks cannot be adjusted in a continuously-variable manner. In other words, the modes that can be implemented by the scanner, specifically, combinations of the reading resolution and the scan speed, are limited.

Accordingly, if none of the modes prepared in the scanner do not correspond to the image forming apparatus to which the scanner is connected, it is difficult to reduce the load on the data bus and carry out image reading at an optimum scan speed.

SUMMARY OF THE INVENTION

The present invention provides an image forming apparatus, an image reading apparatus, a control method thereof, and a storage medium which are capable of reducing a load on a data bus in the image forming apparatus when controlling the image reading apparatus depending on image processing capability of the image forming apparatus.

In order to attain the above-mentioned object, according to a first aspect of the present invention, there is provided an image forming apparatus including a reading unit configured to execute a reading job for reading an image on an original, and an image processing unit configured to perform image processing to the image read by the reading unit, the image forming apparatus comprising a first acquisition unit configured to acquire identification information about the image forming apparatus, a determination unit configured to determine whether or not the acquired identification information is included in a first table in which clock frequencies for respectively controlling hardware of a plurality of reading units are set for each of a plurality of pieces of identification information, and a setting unit configured to set a clock frequency for controlling hardware of the reading unit in accordance with the first table when it is determined that the acquired identification information is included in the first table, while setting the clock frequency for controlling the hardware of the reading unit to a default setting of the first table when it is determined that the acquired identification information is not included in the first table, wherein a minimum value of the clock frequencies in the first table is set as the default setting of the first table.

In order to attain the above-mentioned object, according to a second aspect of the present invention, there is provided an image reading apparatus that reads an image on an original, the image reading apparatus comprising a transmission unit configured to transmit the read image to an image forming apparatus configured to perform image processing, an acquisition unit configured to acquire identification information about the image forming apparatus, a determination unit configured to determine whether or not the acquired identification information is included in a first table in which clock frequencies for respectively controlling hardware of a plurality of image reading apparatuses are set for each of a plurality of pieces of identification information, and a setting unit configured to set a clock frequency for controlling hardware of the image reading apparatus in accordance with the first table when it is determined that the acquired identification information is included in the first table, while setting the clock frequency for controlling the hardware of the image reading apparatus to a default setting of the first table when it is determined that the acquired identification information is not included in the first table, wherein a minimum value of the clock frequencies in the first table is set as the default setting of the first table.

According to the present invention, it is possible to reduce a load on a data bus in an image forming apparatus when controlling an image reading apparatus depending on image processing capability of the image forming apparatus.

Further features of the present invention will become apparent from the following description of exemplary embodiments (with reference to the attached drawings).

BRIEF DESCRIPTION OF THE DRAWINGS

FIG. 11 shows a clock control table for adjusting the scan speed for the reading unit according to the second embodiment.

FIG. 12 is a timing diagram showing a delay time for controlling the scan speed according to the second embodiment.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

First Embodiment

A first embodiment of the present invention will be described below with reference to the drawings.

Figure 1:
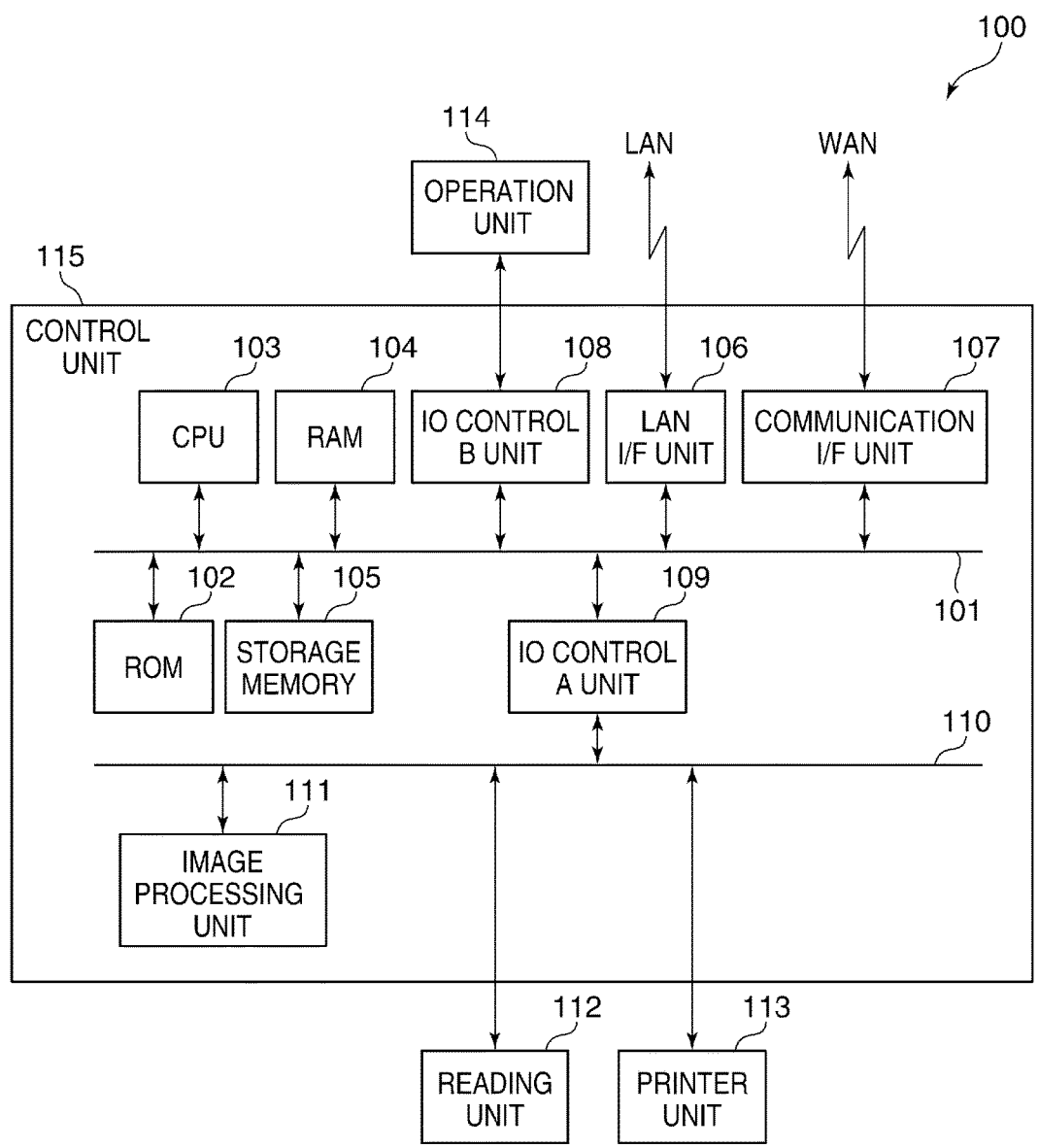
FIG. 1 is a block diagram showing a hardware configuration of a control unit of an image forming apparatus according to a first embodiment of the present invention.

FIG. 1 is a block diagram showing a hardware configuration of a control unit of an image forming apparatus according to a first embodiment of the present invention.

Referring to FIG. 1, an image forming apparatus 100 includes a control unit 115 that controls the overall image forming apparatus 100, an operation unit 114, a reading unit 112 (image reading apparatus), and a printer unit 113, which are connected with the control unit 115.

Each component of the control unit 115 is connected with at least one of a system bus 101 and an image bus 110 each of which functions as a data bus. In this case, the image bus 110 is composed of a general-purpose bus, such as a PCI bus, IEEE1394, or PCIEx and transfers image data at a high speed in collaboration with the system bus 101.

Each component disposed on the system bus 101 will now be described below.

A ROM 102 stores a system boot program. A reading unit control application and a job control application, which are described later, are stored in the ROM 102 or a storage memory 105, and are executed by a CPU 103.

A RAM 104 is a system work memory area for the CPU 103 to execute software, and is an image memory for temporarily storing image data during processing of the image data.

The storage memory 105 is used as an internal storage, and stores data read by the reading unit 112, image data, system software, and the like. The storage memory 105 is composed of an HDD (hard disk) or an SSD (Solid State Drive).

A LAN (local area network) I/F unit 106 is an I/F unit for connecting an external LAN, and inputs information from each device connected with the LAN, or outputs information to the each.

An IO control B unit 108 is a UI (User Interface), which is an interface unit to be connected with the operation unit 114, and outputs, to the operation unit 114, image data displayed on a display device mounted on the operation unit 114. The operation unit 114 is also provided with a key pad device. When a user inputs information using the key pad device, the IO control B unit 108 transmits the information to the CPU 103. Further, the IO control B unit 108 is an I/F unit for the CPU 103 to control the operation unit 114. In the present embodiment, the operation unit 114 is composed of an LCD touch panel or the like, and interprets VGA signals output from the IO control B unit 108 and displays the interpreted VGA signals.

Next, each component disposed on the image bus 110 will be described.

The IO control A unit 109 is a bus bridge that is connected with the image bus 110 and converts the data structure of the image data from the image bus 110 into a data structure for system bus 101.

An image processing unit 111 (image processing unit) is connected with the reading unit 112 and the printer unit 113, which are image input/output devices, and performs synchronous/asynchronous conversion of the image data. The image processing unit 111 performs image processing, such as resolution conversion, compression/expansion, and binary/multi-level conversion, on the input and output image data.

The reading unit 112 includes a scanner unit 112a, which is described in detail below with reference to FIG. 2, and a DF (Document Feeder) unit 112b which is described in detail below with reference to FIG. 3.

Figure 2:
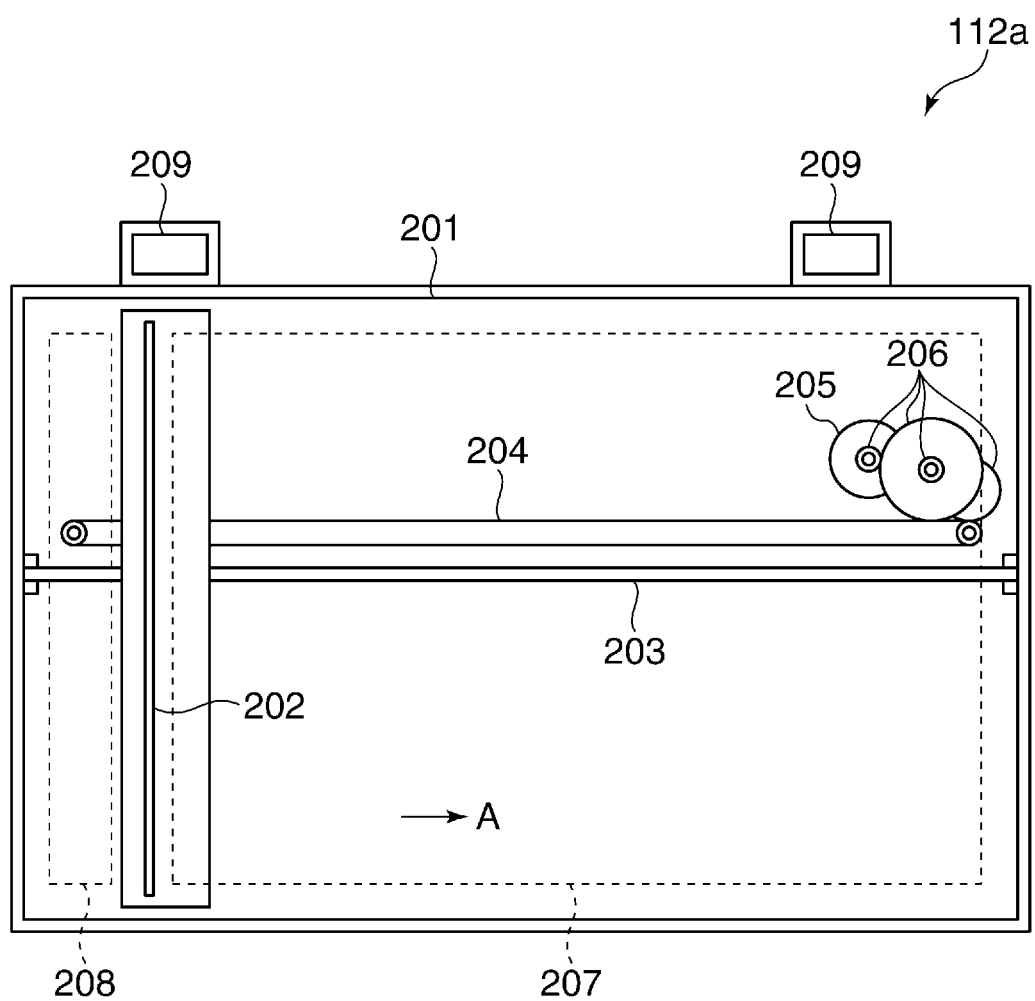
FIG. 2 is a diagram showing a hardware configuration of a scanner unit in a reading unit shown in FIG. 1.

FIG. 2 is a diagram showing a hardware configuration of the scanner unit 112a.

Referring to FIG. 2, a frame body 201 is provided with a reference shaft 203 based on which a sensor unit 202 is moved in a sub-scanning direction (direction indicated by an arrow "A"). A driving force from a flat-bed (FB) reading stepping motor 205 (hereinafter referred to as a stepping motor) is transmitted to a belt 204 through a gear group 206. The belt 204 is used to operate the sensor unit 202 along the reference shaft 203.

It should be noted that the frame body 201 is provided with an original positioning plate glass 207 on which an original is placed, and a DF reading window 208 for DF scanning. The DF reading window 208 is made of a material through which light from an LED serving as a light source is allowed to pass, like the original positioning plate glass 207.

The sensor unit 202 is freely movable within the area of the original positioning plate glass 207 and the DF reading window 208. Specifically, the sensor unit 202 can be moved by a predetermined amount by controlling the number of driving PWM pulses input to the stepping motor 205.

The reading unit 112 which has received a scan instruction from the control unit 115 drives the stepping motor 205 to thereby drive the belt 204 through the gear group 206. This allows the sensor unit 202 to move in a sub-scanning direction along the reference shaft 203, thereby reading the original placed on the original positioning plate glass 207. Sub-scanning thinning-out processing in the scanner unit 112a is implemented by doubling the frequency of a drive pulse input to the stepping motor 205.

Figure 3:
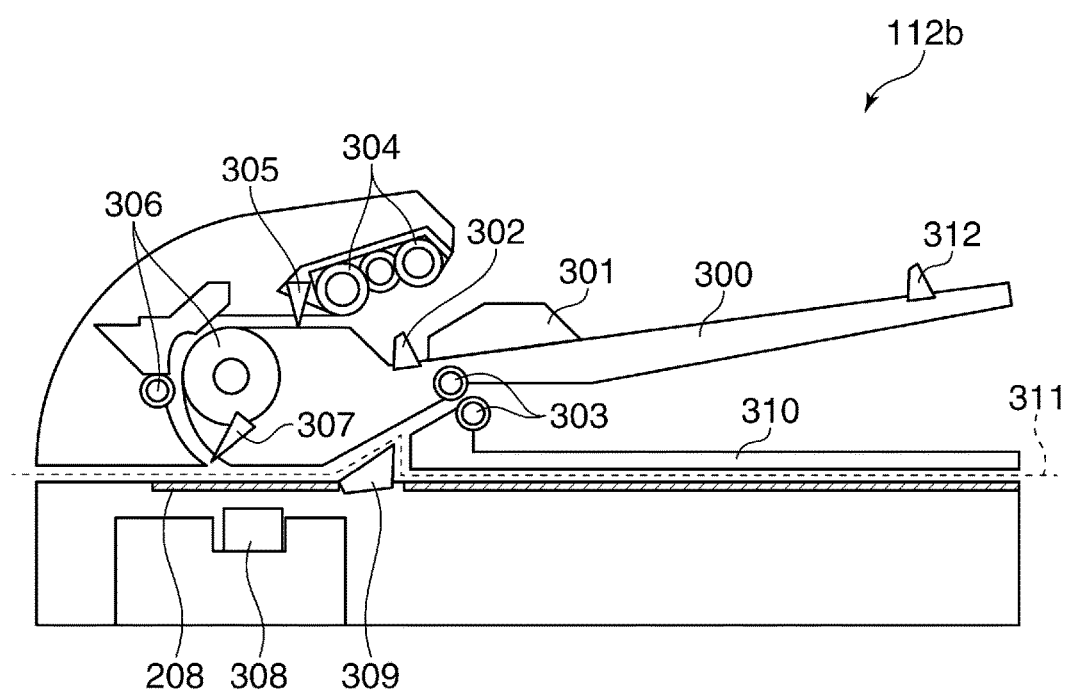
FIG. 3 is a side sectional view showing an internal structure of a DF unit in the reading unit.

FIG. 3 is a side sectional view showing an internal structure of the DF unit 112b.

Referring to FIG. 3, the DF unit 112b is provided with an original tray 300 on which originals to be read are stacked. An original sensor 302, which is used to detect the presence or absence of an original, two original guides 301, and an original size detection sensor 312 are provided on the original tray 300.

The two original guides 301 are provided side by side in an original lengthwise direction (direction perpendicular to the original conveyance direction). The original stacked on the original tray 300 is conveyed by three rollers, including a pickup roller 304, a convey roller 306, and a discharge roller 303.

The pickup roller 304 is a roller for conveying the original stacked on the original tray 300 into an original conveyance path within the DF unit 112b.

The convey roller 306 conveys the original, which has been conveyed to the original conveyance path within the DF unit 112b by the pickup roller 304, to an upper part of the DF reading window 208, and the discharge roller 303 further conveys the original conveyed by the convey roller 306 to a discharge tray 310.

The original conveyed by the pickup roller 304 is detected by an original passage detection sensor 305. Whether or not a first original has passed is determined based on the detected time.

Although not shown, the convey roller 306, the pickup roller 304, and the discharge roller 303 are each driven by a stepping motor. Sub-scanning thinning-out processing in the DF unit 112b is implemented by doubling the frequencies of drive pulses for the convey rollers 306, the pickup rollers 304, and the discharge rollers 303.

The original conveyed by the DF unit 112b is read through the DF reading window 208 by a CIS 308 which is provided on the sensor unit 202 located below the DF reading window 208. As described above, the sensor unit 202 is freely movable in the sub-scanning direction, and is also movable in the same direction as the conveyance direction of the original conveyed from the convey roller 306 toward the discharge roller 303.

It should be noted that the DF reading window 208 has a certain length in the sub-scanning direction. Within the range of the length, the CIS 308 can be moved to any position, and original reading can be performed at the position where the CIS 208 is moved.

The CIS 308 includes photoelectric conversion elements composed of a CCD, a FIFO for accumulating images for each of the photoelectric conversion elements, and a control signal generation unit for controlling the FIFO and the CCD. The CCD included in the CIS 308 is generally implemented in a configuration in which the photoelectric conversion elements are aligned. Image reading from the CIS 308 is controlled by a reading clock 401 (CCD control clock) for reading an image from each of the photoelectric conversion elements and a transfer enable clock 402 for controlling whether or not to transfer the read image to the control unit 115. The reading clock 401 and the transfer enable clock 402 will be described later with reference to FIGS. 4A and 4B.

Figure 4A:
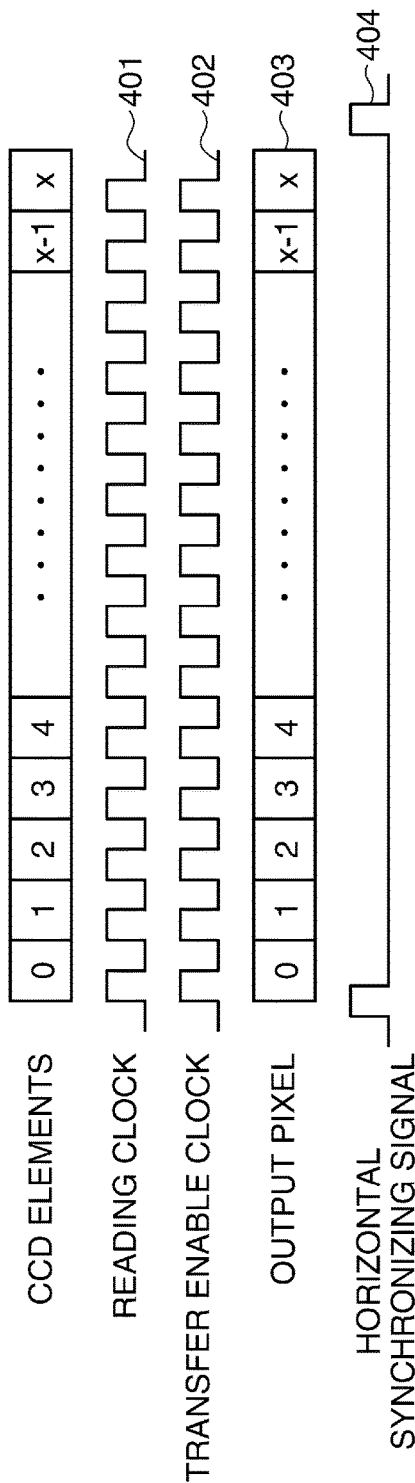
FIG. 4A is a clock timing diagram for controlling image reading from a CIS in FIG. 3.
Figure 4B:
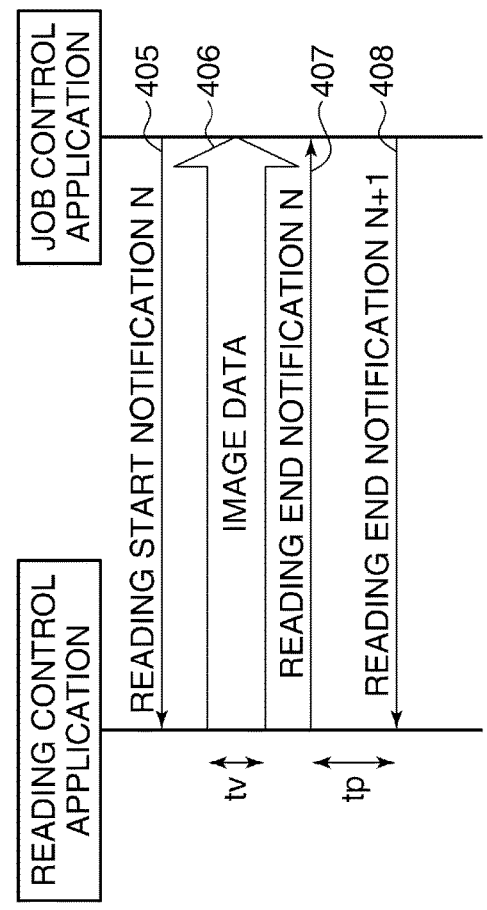
FIG. 4B is a sequence diagram showing a reading control to be performed on the reading unit by the control unit.

FIGS. 4A and 4B are conceptual diagrams showing an operation for controlling image reading from the reading unit 112.

FIG. 4A is a clock timing diagram for controlling image reading from the CIS 308. FIG. 4B is sequence diagram showing a reading control to be performed by the control unit 115 on the reading unit 112.

Data reading from each of the photoelectric conversion elements constituting the CIS 308 is controlled by the reading clock 401. Data from each of the photoelectric conversion elements is read from the CIS 308 at a rising edge of the reading clock 401. The transfer enable clock 402 is input for the read data, and data on each pixel is captured into the FIFO of the CIS 308 in synchronization with the rising edge of the transfer enable clock 402. The data captured into the FIFO is transferred to the control unit 115, if necessary.

For ease of explanation, only the case where the transfer enable clock 402 is input in synchronization with the reading clock 401 without thinning out pixels (i.e., the case where image reading is performed at a maximum reading resolution in the reading unit 112) is herein described. However, the present invention is not limited to this case. The image reading may be performed at a lower reading resolution by thinning out input pixels. Accordingly, in the following case, when a lower reading resolution is set in the reading unit 112, image reading for one line of the CCD from the FIFO can be performed for a shorter period of time, which leads to an improvement in scan speed (reading speed).

A horizontal synchronizing signal 404 is a clock signal (motor control clock) for controlling image capturing start for one line of the CCD constituting the CIS 308. In synchronization with the horizontal synchronizing signal 404, a PWM signal for driving the rollers disposed on the reading unit 112, i.e., the pickup roller 304, the convey roller 306, and the discharge roller 303, is generated. That is, as the cycle of the horizontal synchronizing signal 404 becomes shorter, the rotational speed of each of the rollers is relatively increased and the original conveyance speed is increased, which leads to an improvement in scan speed per original.

However, if the number X of image conversion elements in one line of the CCD is not changed, it is necessary to read data from one line of the CCD for a shorter period of time as the cycle of the horizontal synchronizing signal 404 becomes shorter. Accordingly, there is a need to shorten the cycle of each of the reading clock 401 and the transfer enable clock 402. Further, as the cycle of the reading clock 401 becomes shorter, the amount of data per unit time that is transferred to the RAM 104 or the image processing unit 111 from the reading unit 112 via the image bus 110 increases. In such a case, the amount of data exceeds the capacity of the RAM 104, so that the reading unit 112 may abend. Further, if the amount of data transferred per unit time increases, a load on the image processing unit 111 or the image bus 110 increases. As a result, a delay may occur in, for example, data transfer or image processing (print processing) for actuating a printing job in the printer unit 113.

Accordingly, in the present embodiment, the cycle of each of the horizontal synchronizing signal 404 and the reading clock 401 is set to be long as a default setting, thereby preventing occurrence of the abend of the reading unit 112, and occurrence of a delay in print processing or data transfer. This default setting will be described in detail later in the description regarding a clock control table 600 (first table) shown in FIG. 6 which is described later.

The reading unit 112 will be described below with reference to FIG. 5, assuming that the reading unit 112 is controlled by the reading unit control application executed on the CPU 103 of the control unit 115. However, the present invention is not limited to this embodiment. For example, the reading unit control application may be executed by a CPU other than the CPU 103 of the control unit 115, such as the CPU of the reading unit 112.

The reading control unit 500 is a block including an assembly of hardware for controlling the reading unit 112 by the reading unit control application, and constitutes a part of the reading unit 112. The reading control unit 500 includes a CLK control unit 501, and a CCD control unit 505, a RAM 504, and a motor controller unit 506.

The clock buses 503 and 502 distribute clocks from the CLK control unit 501 to each block.

The CLK control unit 501 includes a crystal resonator for generating a clock, and a PLL element which multiples and divides the frequency of the clock generated by the crystal resonator.

The reading unit control application for controlling the reading control unit 500 causes the CLK control unit 501 to output control clocks to the motor controller unit 506, the CCD control unit 505, and the RAM 504 on the basis of an instruction for scanning. In accordance with the clock input from the CLK control unit 501, each block further performs multiplying and dividing of frequency, and generates a control clock for the motor that rotates CCD elements and the various rollers. The instruction for scanning includes information (job set) such as classification of a color image or a monochromatic image, and a resolution. The reading unit control application changes the setting of the PLL of the CLK control unit 501 depending on the content of the job set. When the setting of the PLL is changed, the frequencies of the various clocks are changed and the scan speed of the reading unit 112 is also changed along with the change of the frequencies.

Figures 5, 6:
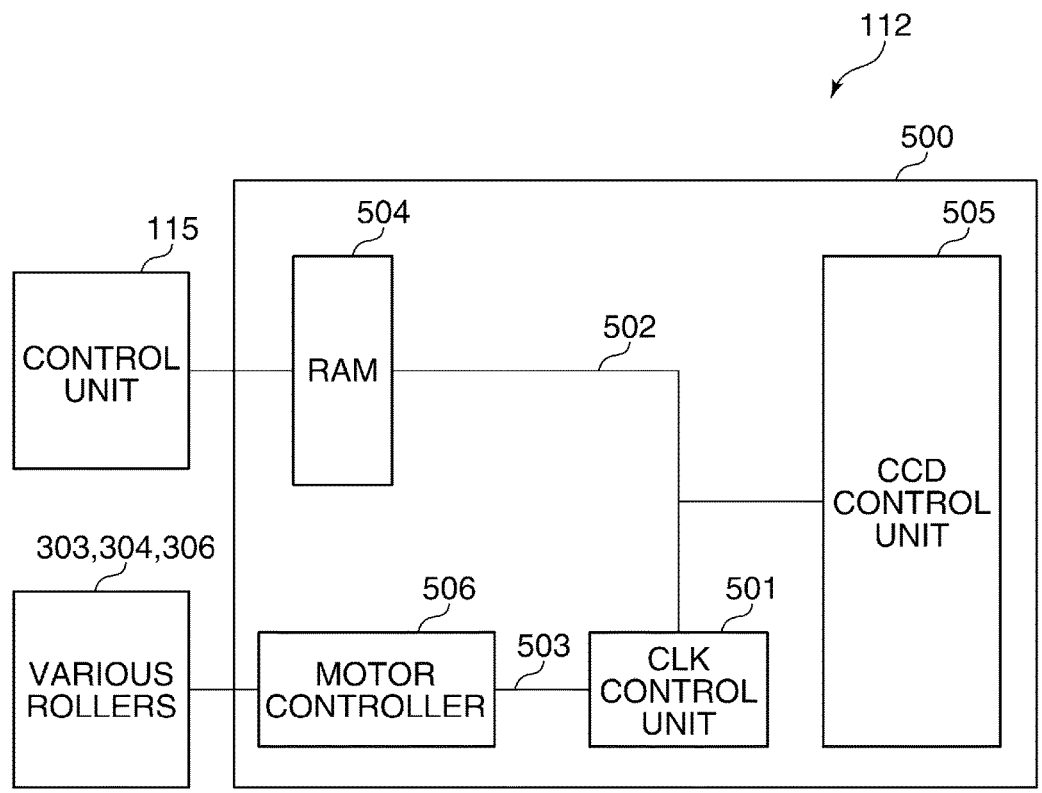
FIG. 5 is a block diagram showing a reading control unit for controlling the reading unit.
FIG. 6 is a clock control table for controlling various clocks for the reading unit according to the first embodiment.

In the clock control table 600 shown in FIG. 6, the frequencies of various clocks depending on the image processing capability of each image forming apparatus which is connectable with the reading unit 112 are registered in advance. The frequencies of various clocks in the reading unit 112 are determined with reference to the clock control table 600. The clock control table 600 is included in the reading unit application which is preliminarily stored in the ROM 102 or the storage memory 105 in a data format that can be processed by the reading unit control application. The present embodiment illustrates a case where the clock control table 600 is included in the reading unit control application. However, it is not limited that the information on the frequencies of the various clocks is included as a table format in the reading unit control application. For example, the reading control application may acquire information about a scan speed instruction from another application, and may dynamically determine the frequencies of the various clocks by a specific logic, or may refer to data stored in a specific area on the ROM 102 to determine the frequencies of the various clocks. Alternatively, the reading control application may determine the frequencies of the various clocks with reference to data stored as a data file on the storage memory 105 or an external server which is not shown.

In the present embodiment, the frequencies of the various clocks included in the clock control table 600 are determined for each model ID (for each identification information), or for each reading resolution. However, this is only for ease of explanation, and information other than the model ID and the reading resolution may be taken into consideration in the table. For example, designation of color reading or monochromatic reading may be taken into consideration, and the configuration information of the clock control table 600 may be changed so that the clock control can be optimized according to the designation of color reading or monochromatic reading.

Further, a clock frequency may be dynamically calculated by a logic in which the above designation is taken into consideration.

In the clock control table 600 of the present embodiment, the scan speed of the reading unit 112 is also preliminarily determined. However, in practice, the scan speed of the reading unit 112 is unambiguously determined according to the frequencies of the various clocks which are preliminarily determined in the clock control table 600.

Information in the clock control table 600 is also used as a clock speed for loading the read image into the control unit 115 and transferring the image to the image processing unit 111. Accordingly, in the present embodiment, the job control application that is executed on the CPU 103 of the control unit 115 and is used to control the overall control unit 115 holds the information in the clock control table 600. Note that the present invention is not limited to the embodiments described above. For example, the job control application and the reading unit control application may refer to the same clock control table 600.

As described above, when the cycle of the horizontal synchronizing signal 404 is shortened and the speed of image reading from the reading unit 112 is increased, the amount of image data flowing through the system bus 101 and the image bus 110 of the control unit 115 increases. As a result, the bandwidth of the image bus 110 in contact with the reading unit 112 may exceed an allowable range, so that the reading unit 112 may abend, or a delay may occur in print processing or data transfer. Accordingly, in the clock control table 600, various control clock frequencies depending on the printing speed, the image processing speed, and the bandwidth of each bus in each image forming apparatus are set for each model ID of a plurality of image forming apparatuses that is connectable with the reading unit 112. A row with a model ID "A" is a default setting row. If a model ID is not transmitted from the outside before reception of a reading instruction execution request, an operation is performed assuming that the model ID "A" is transmitted from the outside. As shown in FIG. 6, the frequencies of the motor control clock and the CCD control clock in the default setting of the model ID "A" are minimum values of the frequencies of the motor control clock and the CCD control clock set in the clock control table 600. Thus, even if the model ID of the image forming apparatus 100 is not supported by the table shown in FIG. 6, the occurrence of the abend of the reading unit 112, or the occurrence of a delay in print processing or data transfer can be prevented.

The scan speed is represented by IPM (Image/Minute) which indicates the number of originals that can be read per minute.

FIG. 4B is a sequence diagram showing a reading operation. This sequence is executed by the reading unit control application for controlling the reading unit 112 and the job control application for controlling the control unit 115. Both the applications are stored in a non-volatile area, such as the ROM 102 or the storage memory 105, and are read onto the RAM 104 after the image forming apparatus 100 is powered on, and then the applications are executed by the CPU 103. When the reading unit control application receives a reading start notification N405 from the job control application, the reading unit control application outputs the various control clocks and performs original reading. When the frequencies of various control clocks are increased, an image transfer period (tv) shown in FIG. 4B is shortened and the scan speed is improved. A period (tp) from an Nth-page original reading end notification 407 to the reception of an (N+1)th-page-original reading start instruction is determined depending on the processing capabilities of the image processing unit 111 and the image bus 110 in the control unit 115 that is connected with the reading unit 112. Accordingly, the period tp varies depending on the configuration of the control unit 115 to be connected with the reading unit 112. If the control unit 115 which is capable of high-speed processing is connected with the reading unit 112, the period tp is shortened and the scan speed is improved. The reading unit control application controls the various clocks in the control unit 115 so as to adjust the period tv to obtain the scan speed set in the clock control table 600.

Figure 7:
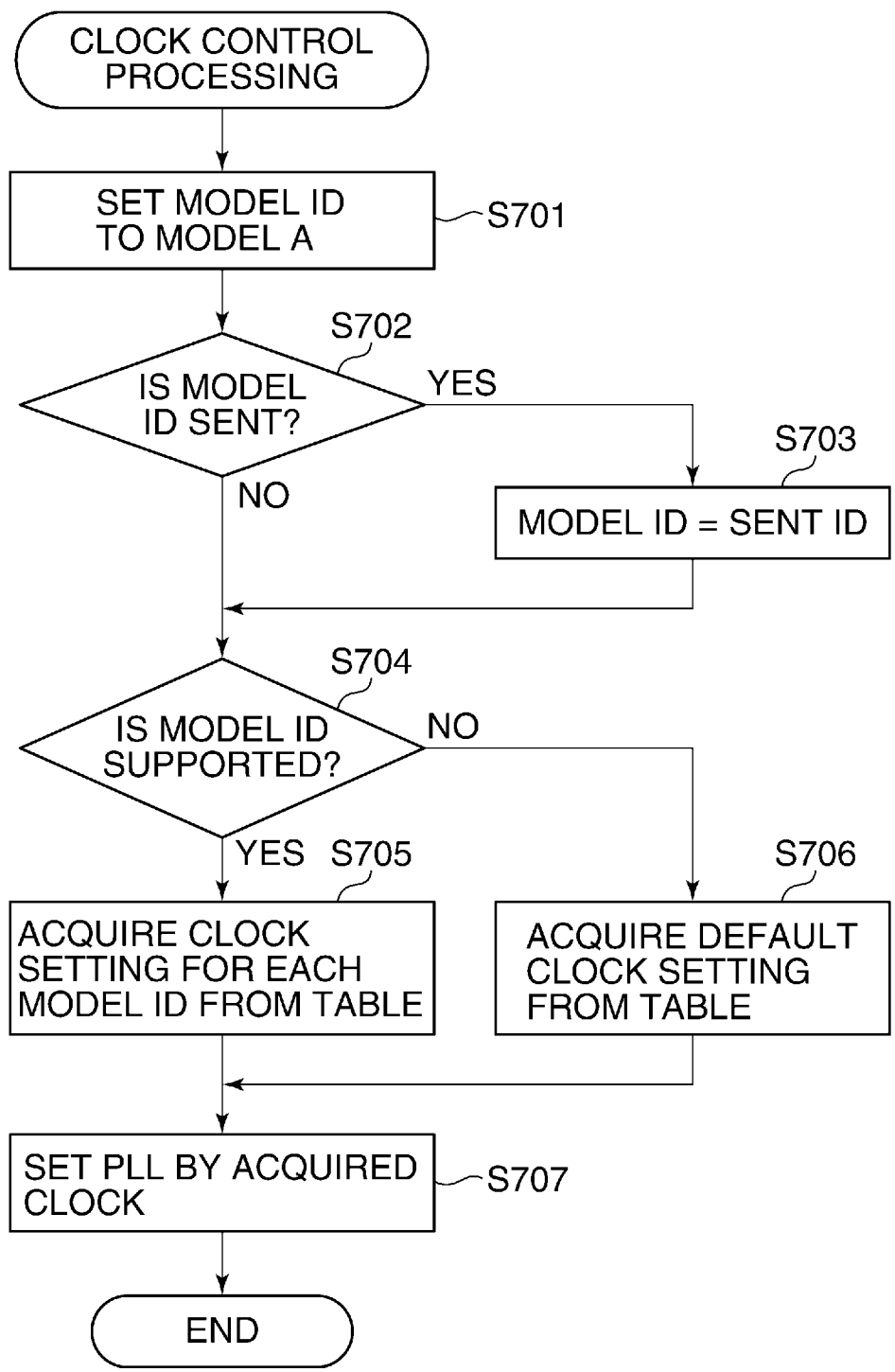
FIG. 7 is a flowchart showing a procedure for clock control process according to the first embodiment.

An operation for actually performing reading processing will be described in detail with reference to flowcharts of FIGS. 7 and 8. Clock control process shown in FIG. 7 is executed by the reading unit control application, and reading start instruction issuance process shown in FIG. 8 is executed by the job control application.

Figure 8:
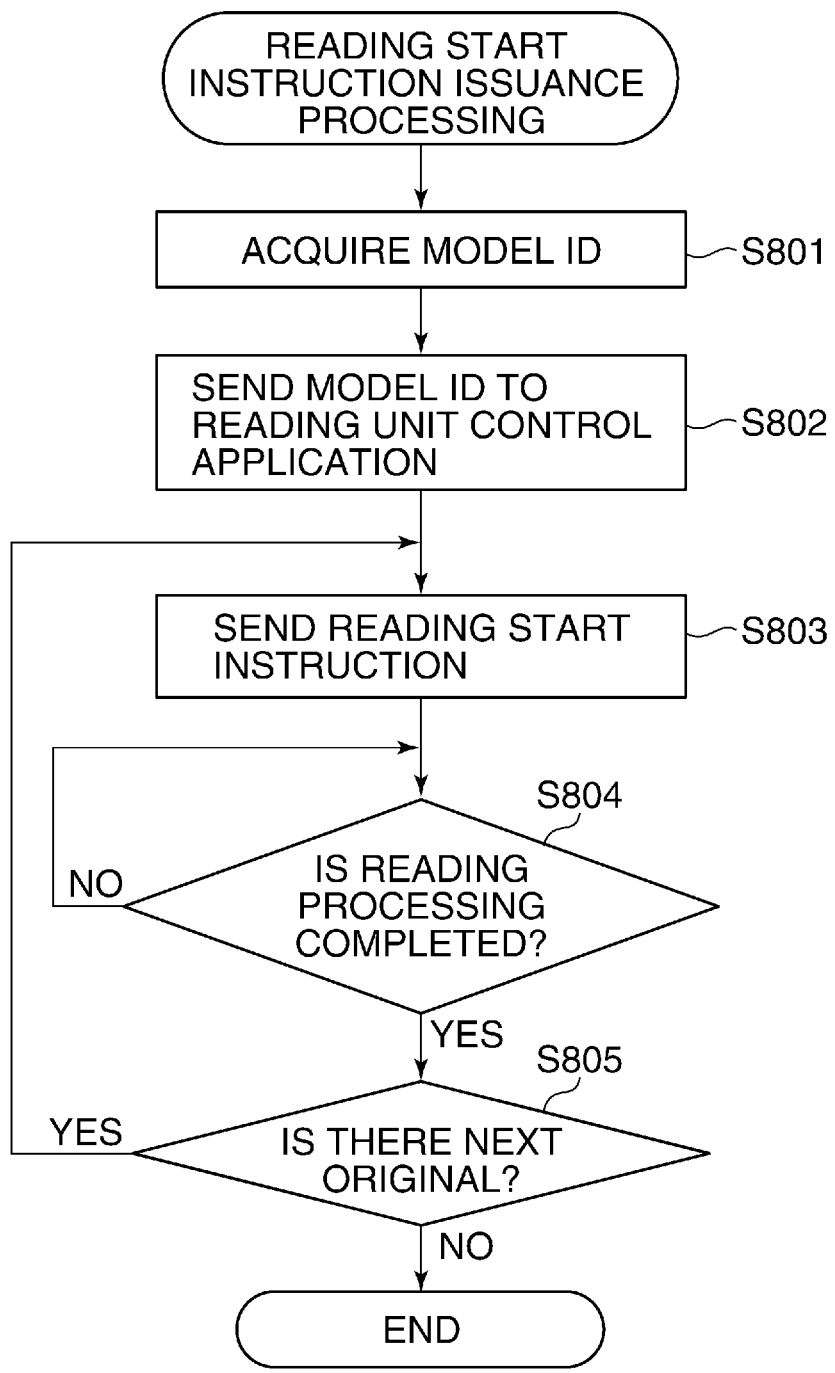
FIG. 8 is a flowchart showing a procedure for reading start instruction issuance process according to the first embodiment.

When the user issues an instruction to execute the reading job on the operation unit 114, the job control application operates according to the flowchart of FIG. 8.

First, in step S801, model ID information is acquired. In the present embodiment, this model ID information is provided as information accumulated on the ROM 102. However, the present invention is not limited to the embodiment. For example, the model ID information may be stored as a part of the configuration information of the printer unit 113 at the time of initializing the connected printer unit 113. Further, for example, the job control application may convert another piece of ID information included in the configuration information of the printer unit 113 into model ID information that can be identified by the reading unit application.

After the acquisition of the model ID, in step S802, the model ID information is sent to the reading unit control application. In the present embodiment, the timing of sending the model ID is set after the issuance of the instruction to execute the reading job. However, the timing of sending the model ID is not limited to this timing. For example, like in an exchange of the configuration information of the printer unit 113, the notification of the information may be performed in advance as a part of initialization processing upon power-on of the image forming apparatus 100. Further, the reading unit control application may directly access the ROM 102 to acquire the model ID.

On the other hand, when the user issues the instruction to execute the reading job on the operation unit 114, the reading unit control application executes processing according to the flowchart of FIG. 7 so as to determine various clock frequencies for reading.

First, in step S701, the model ID information on the reading unit control application is set to a model "A". This step specifies a default operation to be performed when a model ID is not sent from the job control application in step S702 which is described later. A memory field for storing the model ID information on the reading unit control application is secured on the RAM 104, and information about the model ID "A" is stored on the memory field. After that, in step S702, it is determined whether or not the model ID is sent from the job control application.

When the model ID is sent to the reading unit control application in step S802 by the job control application, the memory field secured on the RAM 104 is overwritten with the sent model ID (step S703). When the model ID is not sent, the information about the model ID "A" stored in step S701 is held on the memory field.

Next, in step S704, it is determined whether or not the model ID stored in the memory field secured on the RAM 104 is a model ID that is supported by the reading unit control application. Specifically, it is determined whether or not a model ID that matches the model ID stored in the memory field secured on the RAM 104 is present in the row of model IDs in the clock control table 600. As a result of the determination, when the matching model ID is not present (NO in step S704), various clock frequencies for the model ID "A", which are a default setting, in the clock control table 600 are acquired (step S706). On the other hand, when the matching model ID is present (YES in step S704), various clock frequencies for the matching model ID are acquired from the clock control table 600 (step S705). After that, the various clock frequencies acquired in step S705 or step S706 are determined to be various clock frequencies to operate in the reading unit 112, and set the various clock frequencies acquired in step S705 or step S706 are transmitted to the CLK control unit 501. Accordingly, the CLK control unit 501 is caused to change the setting of the PLL to change the various clock frequencies and the scan speed of the reading unit 112 (step S707), and then the process is terminated.

On the other hand, after sending the model ID to the reading unit control application in step S802, the job control application sends a reading start instruction to the reading unit 112 (step S803). After that, the job control application waits for the end of the reading processing by the reading unit control application (step S804). In step S803, not only the reading start instruction, but also reading conditions are sent to the reading unit 112. Examples of the reading conditions include information about color or monochromatic reading and a reading resolution. These conditions are instructed to the job control application by a user's operation on the operation unit 114, and the instructed conditions are sent to the reading unit control application. In order to receive image data from the reading unit 112 via the image bus 110, the job control application configures settings relevant to image bus control clocks for the image bus 110 and the image processing unit 111. The settings relevant to the image bus control clocks are not described in detail. However, since the image data is transferred from the reading unit 112 pixel by pixel in synchronization with the reading clock 401, a setting for loading the image data in synchronization with the reading clock is configured as one of the settings relevant to the image bus control clocks. Since the image data is transferred from the image reading unit 112 as explained above, the speed of the image bus control clock is higher than that of the reading clock. Note that the method for loading the image data from the reading unit 112 is not limited to the embodiment. For example, a buffer may be provided between the reading unit 112 and the image bus 110; image data may be temporarily stored in the buffer; and the image data stored in the buffer may be loaded as a whole within a single image bus control clock.

When the reading start instruction in step S803 is sent by the job control application, the reading unit 112 starts reading processing. The reading processing is performed when the various clocks are supplied to the CCD control unit 505, the motor controller 506, and the RAM 504 from the CLK control unit 501 that has changed the setting of the PLL in step S707. The image data read by the CCD is temporarily stored in the RAM 504 and is then transferred to the control unit 115. The image data transferred to the control unit 115 is subjected to image processing, image data compression, or the like in the image processing unit 111, and is then stored on the storage memory 105. When the image data is stored on the storage memory 105, the job control application determines that the reading processing in step S804 is terminated, and shifts to step S805.

In step S805, it is determined whether or not there is a next original. If there is a next original, the process is returned to step S803. If it is determined in step S805 that there is no next original, the process is terminated. In this case, a message screen indicating that the reading processing is terminated is displayed on the operation unit 114 so as to inform the user of the termination of the reading processing. Further, when the job control application is now executing a job in which output processing, such as printing or transmission, is performed on the read image data, a control operation such as an operation for starting the output processing in a subsequent stage is carried out.

According to the present embodiment, the CCD control clock and the motor control clock are changed depending on the identification information, such as a model ID, thereby enabling image reading at an optimum scan speed depending on the processing capability of the control unit 115 to be connected with the reading unit 112.

In the clock control table 600 of the present embodiment, a single reading resolution is set for each model ID, but instead a plurality of reading resolutions may be set for each model ID. However, in this case, the CCD control clock, the motor control clock, and the scan speed are set in the clock control table 600 depending on a combination of the model ID and the reading resolution. Further, there is a need for the user to designate the reading resolution in the reading job execution instruction.

Further, in the present embodiment, the reading unit control application is configured to be executed on the CPU 103 of the control unit 115, but instead may be configured to be executed on a CPU, which is not shown, of the reading unit 112.

Second Embodiment

As described above, in the first embodiment, the reading control unit 500 performs clock control according to the clock control table 600 to thereby change the scan speed. In this control, the frequency driving rate and the multiplication rate of the PLL for performing a clock control are not determined in a continuously-variable manner. Instead, a clock frequency to be output to the outside is determined by selecting a value from fixed values such as ½, ⅓, 2-fold, 3-fold, or the like, or combining a plurality values therefrom. Accordingly, even in a case where, for example, a scan speed of 90 IPM, which cannot be expressed in the clock control table 600, is present, it is difficult to implement the scan speed.

In the present embodiment, in such a case, the scan speed is changed by another method, in addition to changing the scan speed by the clock control in the reading control unit 500. Thus, image reading at a speed other than the scan speeds expressed in the clock control table 600 can be achieved.

In a second embodiment described below, the basic configuration shown in FIG. 1 and the like is the same as that of the first embodiment. Accordingly, components having same configurations are denoted by same reference numerals, and repeated explanations are omitted.

In the second embodiment, like in the first embodiment, the reading unit control application is controlled in such a manner that after the user issues the reading job execution instruction, the set value depending on the model ID sent from the job control application is transmitted to the CLK control unit 501. Thus, the control operation of changing the scan speed by switching various clock frequencies of the reading unit 112 is employed. On the other hand, in the reading start instruction issuance process, which is executed by the job control application, the flowchart shown in FIG. 8 is changed to the flowcharts shown in FIGS. 9 and 10.

Figure 9:
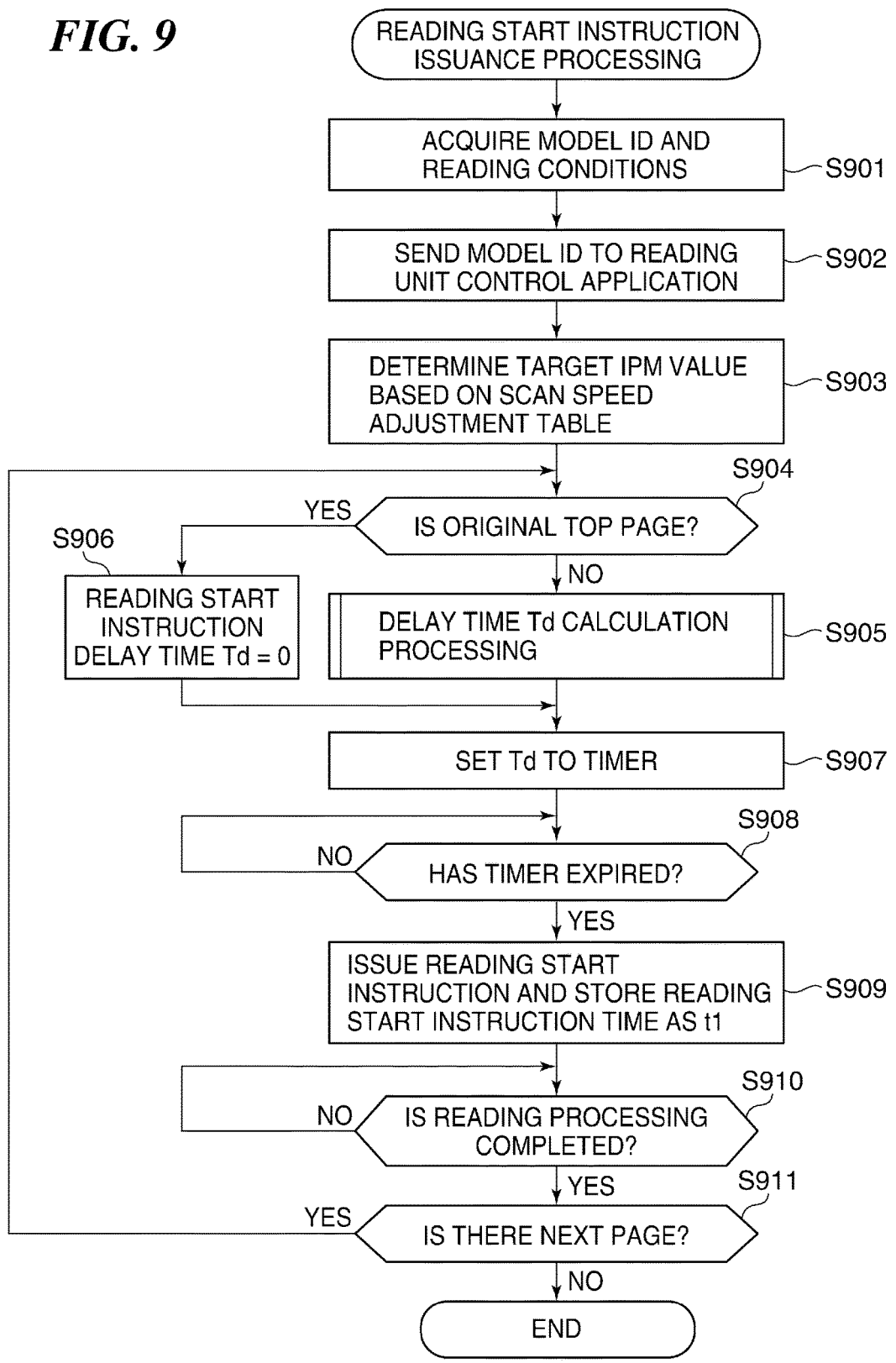
FIG. 9 is a flowchart showing a procedure for reading start instruction issuance process according to a second embodiment.
Figure 10:
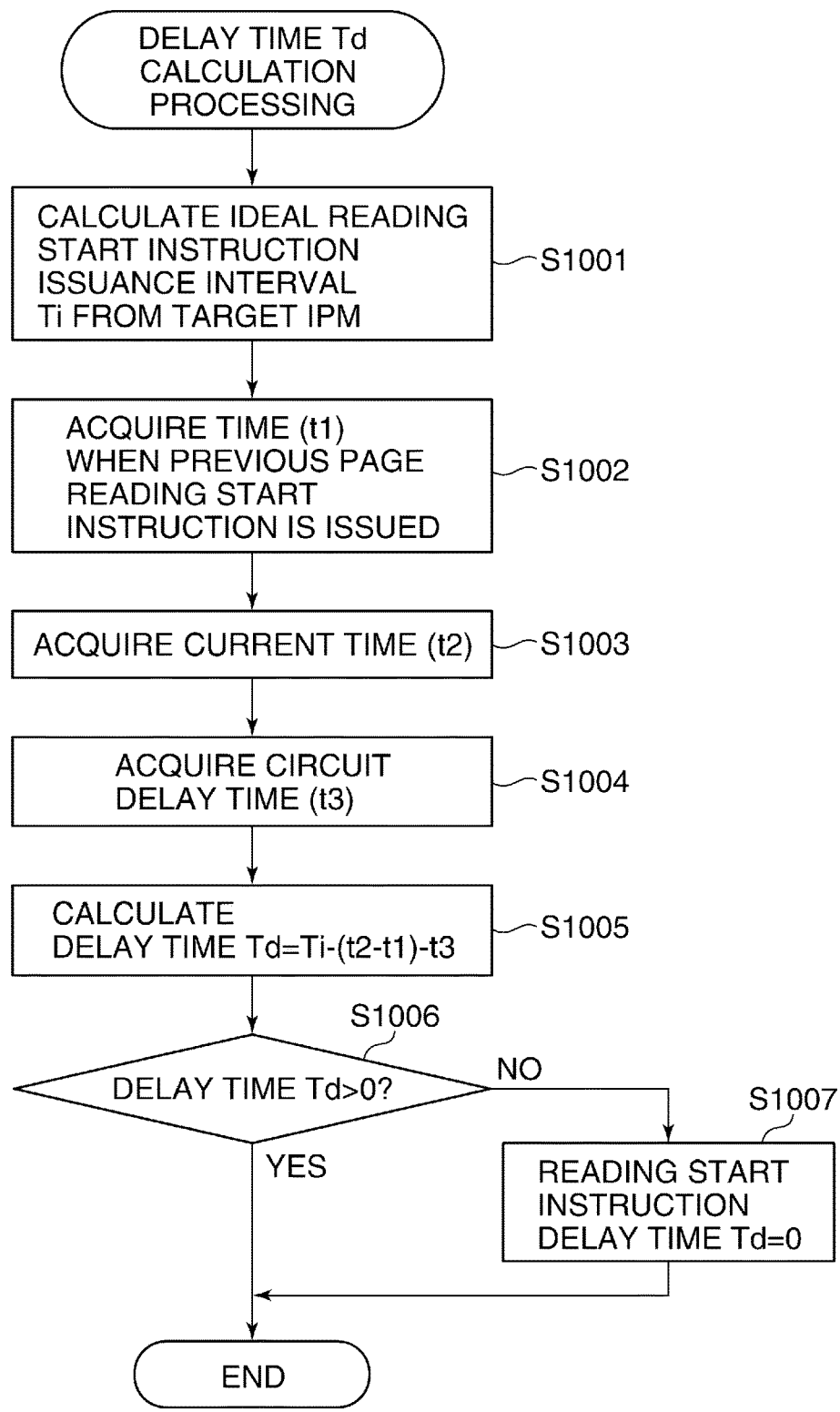
FIG. 10 is a flowchart showing a procedure for delay time calculation process in a step of FIG. 9.

Referring to FIGS. 9 and 10, an operation to be performed when the user sets reading conditions indicating color and a resolution of 600 dpi, and the model ID of the image forming apparatus 100 is "A" will be described by way of example.

Referring to FIG. 9, first, when the user issues the reading job execution instruction, the reading conditions instructed by the user's operation on the operation unit 114 are acquired and the model ID of the image forming apparatus 100 is acquired from the ROM 102 (step S901).

Next, in step S902, like in step S802, the model ID acquired in step S901 is sent to the reading unit control application.

After that, the target IPM value is determined based on the reading conditions and the model ID which are acquired in step S901 and a clock control table 1100 (second table) (step S903). This clock control table 1100 is included in the same application that is preliminarily stored in the ROM 102 or the storage memory 105 in a data format that can be processed by the job control application. However, like the clock control table 600 shown in FIG. 6, the clock control table 1100 is not necessarily included in the job control application as information such as a table. As shown in FIG. 11, in the clock control table 1100 for adjusting the scan speed, the target IPM is set for each combination of three preliminarily registered parameters including a model ID, classification of a color image or a monochromatic image, and a reading resolution. The reading conditions acquired in step S901 indicate color and 600 dpi, and the model ID is "A", thus 70 IPM is designated as the target IPM. When the combination of three parameters acquired in step S901 is not supported by the clock control table 1100, the default value (70 IPM) in the clock control table 1100 is designated as the target IPM. In this case, this default value is a minimum value of the target IPM present in the clock control table 1100. Accordingly, even when the combination of three parameters acquired in step S901 is not supported by the clock control table 1100, a delay time Td, which is described later, can be calculated. In the present embodiment, the components of the clock control table 1100 include three parameters (classification of a color image or a monochromatic image, a reading resolution, and a model ID) and the target IPM set for each combination of three parameters. However, the combination of parameters for setting the target IPM is not limited to the combination of the present embodiment. For example, the target IPM may be set for each combination of four parameters including the sheet size in addition to the three parameters.

The target IPM value in each model ID in the clock control table 1100 is preliminarily set to be equal to or smaller than the scan speed that is unambiguously determined by the frequencies of the CCD clock and the motor control clock for each model ID in the clock control table 600. The target IPM value may be changed based on other conditions, as long as the value does not exceed a limit value of the capability of the scan speed of the image forming apparatus designated by each model ID. For example, the target IPM value may be changed depending on a load on the image processing unit 111 or the image bus 110 during the subsequent processing process (printing, transmission, etc.) for the read image.

After the target IPM value is determined in step S903, it is determined in step S904 whether or not the original is a top page when the reading job is executed. As a result of this determination, when the original is the top page (YES in step S904), the delay time Td of the reading start instruction is calculated as "0" in step S906. In the determination as to whether or not the original is the top page, the first original is determined to be the top page every time a reading job execution instruction is issued by the user.

On the other hand, when the original is not the top page (NO in step S904), a process for calculating the delay time Td of the reading start instruction is performed in step S905. The process in step S905 will be described in detail below with reference to FIG. 10.

The delay time Td calculated in step S905 or step S906 is set to a timer, which is not shown, in the control unit 115 (step S907). After that, a stand-by state is maintained until the timer has expired in step S908, without proceeding to step S909. When it is determined in step S904 that the original is the top page, or when the delay time Td is calculated as "0" in step S905, the timer is activated in step S908 and then expires immediately, i.e., the process proceeds to the subsequent step S909 with no delay time.

After the timer has expired in step S908, the reading start instruction is issued for the reading unit control application in step S909. Information issued as the reading start instruction is the same as that in step S803, and thus the description thereof is omitted. After that, the time when the reading start instruction is issued is set as t1 and stored, then the process proceeds to step S910. The processing of steps S910 and S911 is the same as the processing of steps S804 and S805, and thus the description thereof is omitted.

In a state where the reading start instruction is issued with no delay time for the top page and the time (t1) when the reading start instruction is issued is stored (YES in step S904 and steps S906 to S909), if there is a next page (YES in step S911), the process returns to step S904 again. Since the second and subsequent originals are not the top page, the process for calculating the delay time Td in step S905 (FIG. 10) is executed.

FIG. 10 is a flowchart showing a procedure for the process for calculating the delay time Td in step S905 shown in FIG. 9.

Referring to FIG. 10, first, in step S1001, an ideal reading start instruction issuance interval Ti is calculated based on the target IPM value. Specifically, since the value "70 IPM" is already acquired as the target IPM in step S903, the reading instruction may be issued at an interval of reading 70 originals per minute. Accordingly, an ideal issuance interval of 60/70=857 msec is calculated in step S1001.

In steps S1002, S1003, and S1004, the time (t1) when the reading start instruction for the original on the previous page is issued, a current time (t2), and a circuit delay time (t3) are acquired. In the present embodiment, the time t3 is a preset value calculated from the processing capability of the image processing unit 111. However, the time t3 need not be necessarily fixed to the preset value according to the present embodiment. For example, the time t3 may be dynamically determined depending on the processing content, the CPU speed, or the like of the image processing unit 111. Further, the time t3 may be changed depending on the operation status of printing processing, transmission processing, or the like. Furthermore, the parameter, which may change depending on the operation status of printing processing, transmission processing, or the like, need not be necessarily the time t3. For example, the scan speed may be increased by shortening the interval Ti, as long as the load is small.

After the pieces of information of t1, t2, t3, and Ti are acquired, the delay time Td is calculated in step S1005. The calculation is performed in the time of Td=Ti−(t2−t1)−t3. This time concept is represented as a timing diagram in FIG. 12. In this case, the timing of starting scanning of (N+1)th page from the timing when scanning of Nth page is started will be described.

In the present embodiment, like in the first embodiment, the reading control application controls the operation of the reading control unit 500 in the reading unit 112 so that the scan speed of the model ID "A" becomes 80 IPM, on the basis of the clock control table 600. Thus, a time Tr required for reading is normally 750 msec. The reading unit 112 of the present embodiment can perform reading start processing on the next page immediately after the reading operation is completed, and thus, the time t2 is 750 msec after the time t1. Since the time t2 is 750 msec after the time t1 with respect to 857 msec, which is calculated as the ideal reading start instruction issuance interval Ti in step S1001, the difference between the times, i.e., 107 msec corresponds to a processing time required for delay processing. However, the delay time Td is calculated by taking into consideration of the time t3 and the circuit delay time which is set in consideration of a processing delay in the image processing to be performed by ASIC in the image processing unit 111, an overhead of the application operation, or the like. Accordingly, the value obtained by subtracting the time t3 from the pure delay time is represented by Td=Ti−(t2−t1)−t3. By the above-mentioned calculation, the delay time Td is calculated in step S1005.

As a result of calculating Td in step S1005, when Td is a value greater than zero (YES in step S1006), the process shown in FIG. 10 is terminated. On the other hand, when Td is equal to or less than zero (NO in step S1006), the scan speed is lower than the target speed. Accordingly, the delay time Td is set to zero (step S1007) and the process of FIG. 10 is terminated.

By performing this operation on each original, the scan speed of the reading unit 112 can be dynamically changed depending on the capabilities of the image processing unit 111 and the image bus 110, and the reading unit 112 can be operated while adjusting the load on the image processing unit and the image bus at an optimum scan speed.

Note that in the present embodiment, the reading unit control application and the job control application are executed on the CPU 103 of the control unit 115. However, the applications may be executed on a CPU, which is not shown, of the reading unit 112.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-165739, filed Aug. 26, 2016, which is hereby incorporated by reference herein in its entirety.

What is claimed is:

1. An image forming apparatus including a reading unit configured to execute a reading job for reading an image on an original, and an image processing unit configured to perform image processing to the image read by said reading unit, the image forming apparatus comprising:
a first acquisition unit configured to acquire identification information about the image forming apparatus;
a determination unit configured to determine whether or not the acquired identification information is included in a first table in which clock frequencies for respectively controlling hardware of a plurality of reading units are set for each of a plurality of pieces of identification information; and
a setting unit configured to set a clock frequency for controlling hardware of the reading unit in accordance with the first table when it is determined that the acquired identification information is included in the first table, while setting the clock frequency for controlling the hardware of the reading unit to a default setting of the first table when it is determined that the acquired identification information is not included in the first table,
wherein a minimum value of the clock frequencies in the first table is set as the default setting of the first table.

2. The image forming apparatus according to claim 1, further comprising a holding unit configured to hold the first table.

3. The image forming apparatus according to claim 1, wherein the identification information is a model ID.

4. The image forming apparatus according to claim 1, further comprising:
a second acquisition unit configured to acquire a reading condition in the reading job;
a determination unit configured to determine a target reading speed in accordance with a second table in which a target reading speed of said reading unit is set for each of a plurality of combinations of identification information and a reading condition registered in advance, when the second table includes a combination of the identification information and the reading condition acquired by said first acquisition unit and said second acquisition unit; and
a control unit configured to control an interval of issuance of image reading instructions for said reading unit according to the target reading speed determined by said determination unit.

5. The image forming apparatus according to claim 4, wherein the target reading speed in the second table is set to be equal to or lower than a reading speed determined according to a clock frequency set for the same identification information in the first table.

6. The image forming apparatus according to claim 4, wherein when the second table does not include the acquired combination, said determination unit determines the target reading speed as the default setting of the second table.

7. The image forming apparatus according to claim 6, wherein a minimum value of the target reading speed in the second table is set as the default setting of the second table.

8. The image forming apparatus according to claim 4, further comprising a holding unit configured to hold the second table.

9. The image forming apparatus according to claim 4, wherein the identification information is a model ID.

10. The image forming apparatus according to claim 4, wherein the reading condition includes a reading resolution of said reading unit during execution of the reading job, and whether the image on the original to be read by said reading unit is a color image or a monochromatic image.

11. An image reading apparatus that reads an image on an original, the image reading apparatus comprising:
a transmission unit configured to transmit the read image to an image forming apparatus configured to perform image processing;
an acquisition unit configured to acquire identification information about the image forming apparatus;
a determination unit configured to determine whether or not the acquired identification information is included in a first table in which clock frequencies for respectively controlling hardware of a plurality of image reading apparatuses are set for each of a plurality of pieces of identification information; and
a setting unit configured to set a clock frequency for controlling hardware of the image reading apparatus in accordance with the first table when it is determined that the acquired identification information is included in the first table, while setting the clock frequency for controlling the hardware of the image reading apparatus to a default setting of the first table when it is determined that the acquired identification information is not included in the first table,
wherein a minimum value of the clock frequencies in the first table is set as the default setting of the first table.

12. A control method for an image reading apparatus for reading an image on an original and an image forming apparatus for performing image processing to the read image, the control method comprising:
an acquisition step of acquiring identification information about the image forming apparatus; and
a determination step of determining whether or not the acquired identification information is included in a first table in which clock frequencies for respectively controlling hardware of a plurality of image reading apparatuses are set for each of a plurality of pieces of identification information; and a setting step of setting a clock frequency for controlling hardware of the image reading apparatus in accordance with the first table when it is determined that the acquired identification information is included in the first table, while setting the clock frequency for controlling the hardware of the image reading apparatus to a default setting of the first table when it is determined that the acquired identification information is not included in the first table, wherein a minimum value of the clock frequencies in the first table is set as the default setting of the first table.

13. A non-transitory computer-readable storage medium having stored therein a program for causing a computer to implement a method of controlling an image reading apparatus for reading an image of an original and an image forming apparatus for image processing to the read image, the method comprising:

an acquisition step of acquiring identification information about the image forming apparatus; and a determination step of determining whether or not the acquired identification information is included in a first table in which clock frequencies for respectively controlling hardware of a plurality of image reading apparatuses are set for each of a plurality of pieces of identification information; and a setting step of setting a clock frequency for controlling hardware of the image reading apparatus in accordance with the first table when it is determined that the acquired identification information is included in the first table, while setting the clock frequency for controlling the hardware of the image reading apparatus to a default setting of the first table when it is determined that the acquired identification information is not included in the first table, wherein a minimum value of the clock frequencies in the first table is set as the default setting of the first table.

14. A control method for an image reading apparatus for reading an image on an original, the control method comprising:

a transmission step of transmitting the read image to an image forming apparatus configured to perform image processing;

an acquisition step of acquiring identification information about the image forming apparatus; and a determination step of determining whether or not the acquired identification information is included in a first table in which clock frequencies for respectively controlling hardware of a plurality of image reading apparatuses are set for each of a plurality of pieces of identification information;

a setting step of setting a clock frequency for controlling hardware of the image reading apparatus in accordance with the first table when it is determined that the acquired identification information is included in the first table, while setting the clock frequency for controlling the hardware of the image reading apparatus to a default setting of the first table when the acquired identification information is not included in the first table, wherein a minimum value of the clock frequencies in the first table is set as the default setting of the first table.

15. A non-transitory computer-readable storage medium having stored therein a program for causing a computer to implement a method of controlling an image reading apparatus for reading an image of an original, the method comprising:

a transmission step of transmitting the read image to an image forming apparatus configured to perform image processing;

an acquisition step of acquiring identification information about the image forming apparatus; and a determination step of determining whether or not the acquired identification information is included in a first table in which clock frequencies for respectively controlling hardware of a plurality of image reading apparatuses are set for each of a plurality of pieces of identification information; and a setting step of setting a clock frequency for controlling hardware of the image reading apparatus in accordance with the first table when it is determined that the acquired identification information is included in the first table, while setting the clock frequency for controlling the hardware of the image reading apparatus to a default setting of the first table when the acquired identification information is not included in the first table, wherein a minimum value of the clock frequencies in the first table is set as the default setting of the first table.

* * * * *